United States Patent [19]

Skrippek

[11] Patent Number: 5,894,746
[45] Date of Patent: Apr. 20, 1999

[54] DRIVE DEVICE FOR A FRONT-LOADING WASHING MACHINE

[75] Inventor: Jörg Skrippek, Priort, Germany

[73] Assignee: BSH Bosch und Siemens Hausgeraete GmbH, Munich, Germany

[21] Appl. No.: 08/767,958

[22] Filed: Dec. 19, 1996

[30] Foreign Application Priority Data

Dec. 20, 1995 [DE] Germany ............... 195 47 745

[51] Int. Cl.$^6$ .................................................. D06F 37/30
[52] U.S. Cl. .................................................. 68/140
[58] Field of Search ............................... 68/12, 16, 24, 68/140; 310/156, 216, 261

[56] References Cited

U.S. PATENT DOCUMENTS

| 4,446,706 | 5/1984 | Hartwig .................. 68/140 X |
| 5,304,885 | 4/1994 | Wong et al. .................. 310/216 |

FOREIGN PATENT DOCUMENTS

| 1354594 | 1/1964 | France .................. 68/24 |
| 4157 | 7/1956 | Germany .................. 68/24 |

*Primary Examiner*—Philip R. Coe
*Attorney, Agent, or Firm*—Herbert L. Lerner; Laurence A. Greenberg

[57] ABSTRACT

A drive device for a front-loading washing machine having a washing liquid-container with a rear wall, an at least substantially horizontal shaft with an outer end, and a laundry drum supported overhung on the shaft, includes a flat motor for directly driving the shaft. The flat motor has a rotor fastened at the outer end of the shaft and a stator rigidly attached to the rear wall of the washing liquid container and having exciter windings, an integrated flange with an inner periphery and a central bearing sleeve for the shaft. Lamination stacks receive the exciter windings and are distributed at the inner periphery of the flange. The rotor has circumferentially distributed magnetizable poles disposed opposite and across a minimum air gap from the lamination stacks.

7 Claims, 2 Drawing Sheets

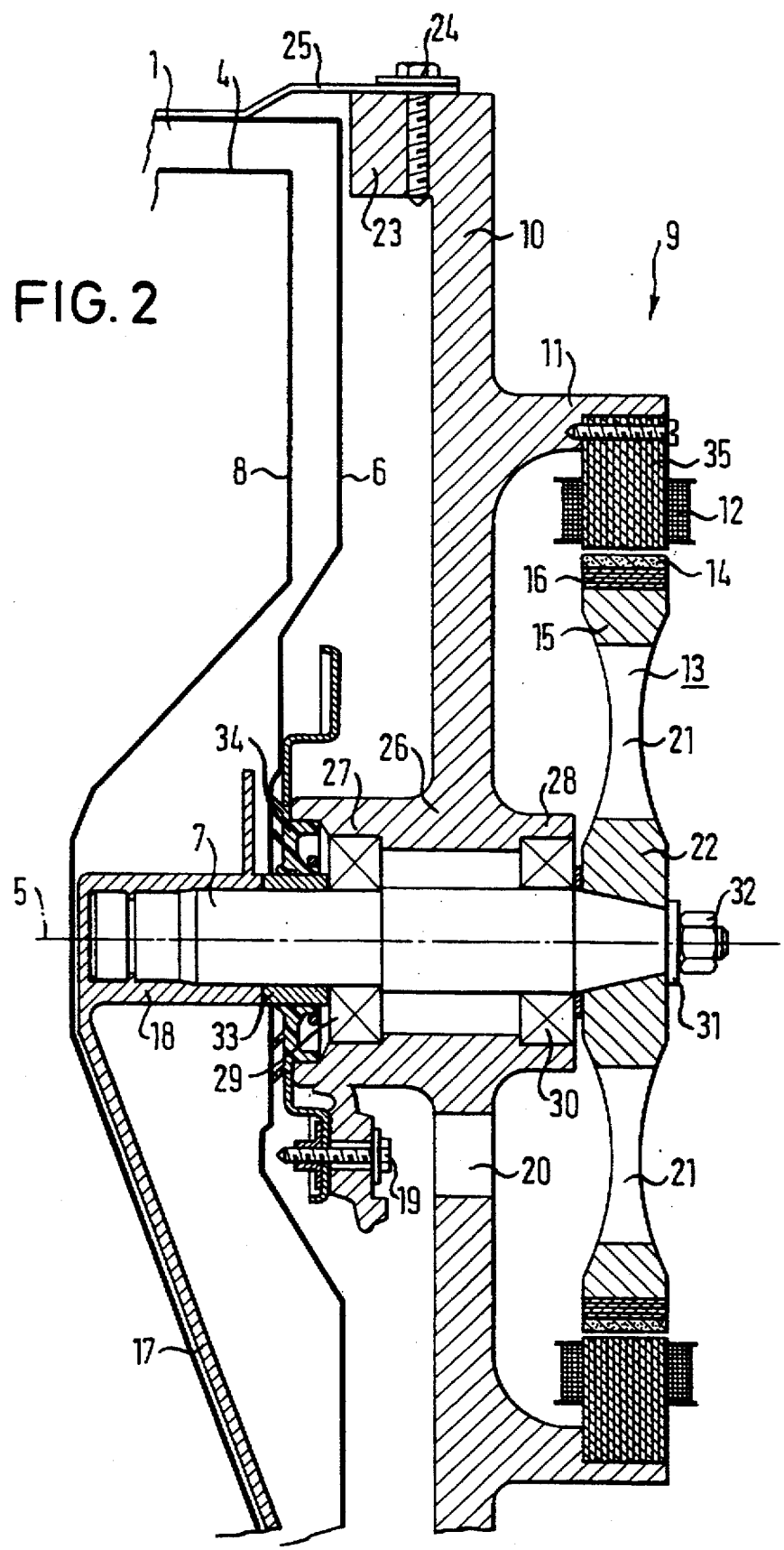

DRIVE DEVICE FOR A FRONT-LOADING WASHING MACHINE

BACKGROUND OF THE INVENTION

FIELD OF THE INVENTION

The invention relates to a drive device for a front-loading washing machine having a laundry drum which is supported overhung by an at least substantially horizontal shaft within a bearing sleeve of a stiff carrier part mounted at a rear-wall of a washing liquid container, which is driven directly by a flat motor that is likewise mounted at the rear wall of the washing liquid container.

Such drive devices are known from German Published, Non-Prosecuted Patent Applications DE 39 27 426 A1 and the DE 43 41 832 A1. In those devices, the stator of the motor which is constructed as a collectorless external rotor direct current motor, is fastened directly on the bearing sleeve of the stiff carrier part. The shaft is supported in the bearing sleeve and connected at its outer end with the rotor of the motor so as to be secure against rotation. The rotor therein is a so-called external rotor which engages over the stator windings like a pot and carries poles constructed as permanent magnets. In automatic washing machines according to German Published, Non-Prosecuted Patent Application DE 43 41 832 A1, the motor is additionally surrounded by an insulating rod which attenuates noises radiated directly from the motor to the surrounding atmosphere.

In the known drive devices, the stator is exposed to an appreciable temperature loading in its windings due to heat flow. The stator is encapsulated by a rotor having a pot-shaped structure (and additionally by a sound-insulating hood in the case of German Published, Non-Prosecuted Patent Application DE 43 41 832 A1) so strongly that cooling of the motor does not take place at all. That is also enhanced above all by a direct driving motor of the type that is hardly able to reach self-cooling by virtue of the running rotor, because of its necessarily low inherent rpm. Therefore, the known drive devices are practically only usable when they are protected against rapid overheating by external cooling.

SUMMARY OF THE INVENTION

It is accordingly an object of the invention to provide a drive device for a front-loading washing machine, which overcomes the hereinafore-mentioned disadvantages of the heretofore-known devices of this general type in such a way that cooling of stator windings by ambient air can be readily assured and the motor cannot overheat during orderly operation with dimensions that meet demands.

With the foregoing and other objects in view there is provided, in accordance with the invention, in a front-loading washing machine having a washing liquid-container with a rear wall, an at least substantially horizontal shaft having an outer end, and a laundry drum supported overhung on the shaft, a drive device, comprising a flat motor for directly driving the shaft, the flat motor having a rotor fastened at the outer end of the shaft, a stator rigidly attached to the rear wall of the washing liquid container, the stator having exciter windings, the stator having an integrated flange with an inner periphery and a central bearing sleeve for the shaft, lamination stacks receiving the exciter windings and being distributed at the inner periphery of the flange, and the rotor carrying circumferentially distributed magnetizable poles opposite and across an air gap from the lamination stacks.

Due to the construction according to the invention, the motor is given an open form of structure and the heat-generating components thereof, that above all are the stator windings which are disposed externally in this case, can be cooled from all sides by the ambient air. Even the low rotational speed of the motor during washing operation then still suffices for an adequate cooling effect.

In accordance with another feature of the invention, the motor is an electronically commutated direct current motor. In this way, the heat development can moreover be kept extremely small. Maintenance services are not required (no carbon brushes). The service life is limited merely by a possible bearing wear.

In accordance with a further feature of the invention, the rotor is equipped with an encompassing stack of dynamo iron sheets and permanent magnet segments disposed thereon. The permanent magnet segments result in a forceful torque and the dynamo iron sheets form a particularly good magnetic return flux. The production of the required coils of sheet iron is relatively uncomplicated and favorable in terms of costs due to automation of the winding process especially for a motor with an internally running rotor.

In accordance with an added feature of the invention, in order to increase the cooling effect, the rotor is equipped as a carrier body for the lamination stack with spokes disposed in a star shape. For this purpose, parts of the rotor, for example the spokes, should be formed in such a way that they enhance air movements arising during the rotational movements of the rotor.

In accordance with an additional feature of the invention, the exciter windings are carried by the stator lamination stacks, which are formed of dynamo iron sheets.

In accordance with a concomitant feature of the invention, in order to facilitate reproducibly accurate assembly, the centered connection of the rotor so as to be secure against relative rotation at the shaft can be augmented by a form-locking profiled shaft connection, a profiled hub connection, a fitted key connection, a conical groove connection or a keyway connection. A form-locking connection is one which connects two elements together due to the shape of the elements themselves, as opposed to a force-locking connection, which locks the elements together by force external to the elements.

Other features which are considered as characteristic for the invention are set forth in the appended claims.

Although the invention is illustrated and described herein as embodied in a drive device for a front-loading washing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 an enlarged, fragmentary, partly-sectional view of the motor according to FIG. 1 which is mounted at a rear wall.

DESCRIPTION OF THE PREFERRED EMBODIMENTS

Figure 1:
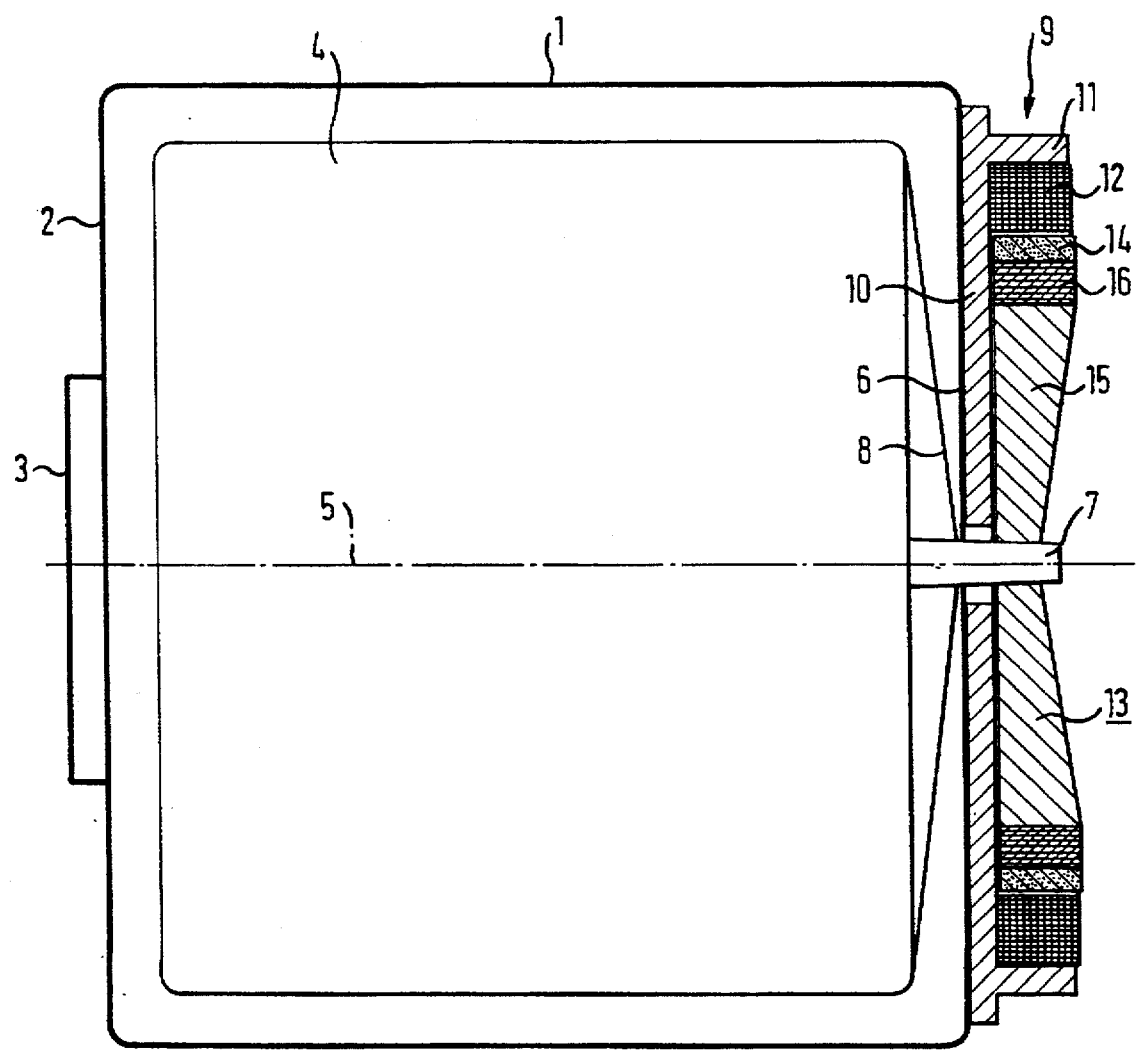
FIG. 1 is a diagrammatic, side-elevational view of a washing liquid container of a washing machine with an internal horizontally-supported laundry drum having a drive shaft to which a rotor of a motor according to the invention is flanged.

Referring now to the figures of the drawings in detail and first, particularly, to FIG. 1 thereof, there is seen a washing liquid container 1 that is supported overhung in a non-illustrated manner in a likewise non-illustrated housing of a washing machine. The washing liquid container 1 has a front wall 2 with an opening 3 for the loading and unloading of a laundry drum 4, which is supported on a rear wall 6 of the washing liquid container 1 in such a way as to be rotatable about a horizontal axis 5. A shaft 7, which is connected with a rear wall 8 of the laundry drum 4 so as to be secure against relative rotation, serves to support the laundry drum 4.

A motor 9, which is mounted at the rear wall 6 of the washing liquid container 1, has a stator support part 10 that is connected with the rear wall 6 in such a way as to be secure against rotation. Stator windings 12 are distributed at an inner casing surface of a flange 11 of the stator support part 10 and during rotation of a rotor 13 they correspond in alternation with poles 14 thereof, which in this case are formed of permanent magnets that are likewise distributed in the manner of segments about the circumference of the rotor. Lamination stacks 35 are shown in FIG. 2. A magnetic return flux of the magnet segments of the poles 14 is formed by a stack of dynamo iron sheets 16, which is wound onto a rim 15. The motor can thereby introduce its driving torque directly by way of a journal of the shaft 7 into the laundry drum 4.

According to FIG. 2, the rear wall 8 of the laundry drum 4 is stiffened by a carrying spider 17, having a hub 18 which is connected with the journal of the shaft 7 in such a way as to be secure against relative rotation. The stator support part 10 is furthermore screwed to the rear wall 6 of the washing liquid container 1 by screws 19 in such a way as to be secure against relative rotation. In order to ensure that a washing machine fitter in the washing machine manufacturing plant can mount the support part 10 at the rear wall of the washing liquid container, access holes 20 are disposed in the support part above the screws 19. The rotor disc 13 in any case has spokes 21 between its hub 22 and the rim 15 serving as a carrier ring for the magnet segments so that access through spoke gaps is readily possible.

Furthermore, the stator support part 10 has an outer periphery which carries several, preferably three, fastening eyes 23, that are distributed over the circumference of the washing liquid container 1, which result in a firm connection with the washing liquid container through the use of screws 24 and additionally by way of straps 25 welded to the washing liquid container 1.

A bearing sleeve 26 of the stator support part 10 forms bearing seats 27 and 28 for rolling bearings 29 and 30, having inner rings which are drawn with a good fit onto the journal of the shaft 7 of the laundry drum 4 and are secured at an outer end through the use of a pressure washer 31 and a central screw 32 so that they connect the stator 13 by way of its hub 22 and the inner rings of the rolling bearings 29 and 30 with the laundry drum so as to be secure against relative rotation. In that case, a spacer ring 33, which is polished on its outer surface, is pressed-in between the hub 18 of the carrying spider 17 of the laundry drum 4 and the inner ring of the rolling bearing 29. A sealing ring 34, having sealing lips at the shaft side which are retained on the polished outer surface of the spacer ring 33 through the use of a spring ring, is connected with a step of the bearing sleeve 26 of the stator support part 10. The sealing lips facing the rear wall 6 of the washing liquid container 1 lie with axial pressure against a likewise polished annular surface of the metal sheet of the rear wall 6. Washing liquid endeavoring to get out of the washing liquid container is thereby prevented from emerging.

The motor can also be constructed as so-called switched reluctance motor. In this case, the rim of the stator or its bearing surface is formed of a ferromagnetically relatively poorly conducting material.

The assembly of the stator is comparable with that of an electronically commutated direct current motor. The advantage of the reluctance motor is in particular in a construction of the rotor at more favorable costs (no expensive magnetic materials).

In order to provide better security against relative rotation between the rotor 13 and the shaft 7, the screw connection 31 and 32 of the rotor 13 at the shaft 7 can be augmented by a non-illustrated profiled shaft connection, a profiled hub connection, a fitted key connection, a conical groove connection or a keyway connection.

I claim:

1. In a front-loading washing machine having a washing liquid-container with a rear wall, an at least substantially horizontal shaft having an outer end, and a laundry drum supported overhung on the shaft, a drive device, comprising:

a flat motor for directly driving the shaft, said flat motor having a rotor fastened at the outer end of the shaft, and a stator having a support part rigidly and directly attached to the rear wall of the washing liquid container for reinforcing the washing liquid container, said stator having exciter windings, said stator having an integrated flange with an inner periphery and a central bearing sleeve for the shaft, lamination stacks receiving said exciter windings and being distributed at said inner periphery of said flange, and said rotor carrying circumferentially distributed magnetizable poles opposite and across an air gap from said lamination stacks.

2. The drive device according to claim 1, including an assembly disk mounted at the rear wall of the washing liquid container, for connecting said stator to the rear wall of the washing liquid container.

3. The drive device according to claim 2, wherein said rotor has an encompassing stack of dynamo iron sheets and said poles have permanent magnet segments disposed on said sheets.

4. The drive device according to claim 2, wherein said lamination stacks of said stator include dynamo iron sheets carrying coils with said excitation windings.

5. The drive device according to claim 1, including a first set of bearings and a second set of bearings disposed in said central bearing sleeve in front of said rotor as viewed from the laundry drum for engaging the shaft.

6. The drive device according to claim 5, including a spacer ring and a sealing ring disposed next to said central bearing sleeve adjacent said first set of bearings sealing off the washing liquid container from said first set of bearings and said second set of bearings.

7. The drive device according to claim 1, wherein said rotor has an end remote from the laundry drum and said shaft is removably secured to said rotor at said end remote from the laundry drum.

* * * * *

UNITED STATES PATENT AND TRADEMARK OFFICE
CERTIFICATE OF CORRECTION

PATENT NO. : 5,894,746
DATED : April 20, 1999
INVENTOR(S) : Jorg Skrippek

It is certified that error appears in the above-indentified patent and that said Letters Patent is hereby corrected as shown below:

TITLE PAGE

Item [30] should read as follows:

Dec. 19, 1995        [DE]        Germany ........ 195 47 456.2

Signed and Sealed this

Twenty-eighth Day of September, 1999

Attest:

Q. TODD DICKINSON

Attesting Officer

Acting Commissioner of Patents and Trademarks